(12) United States Patent
Keller et al.

(10) Patent No.: US 9,254,873 B2
(45) Date of Patent: Feb. 9, 2016

(54) IMPACT ELEMENT AND SUPPORTING FRAME FOR A MOTOR VEHICLE

(71) Applicant: Dr. Ing. h.c. F. Porsche Aktiengesellschaft, Stuttgart (DE)

(72) Inventors: Ralf Keller, Niefern-Oeschelbronn (DE); Eduard Ewert, Karlsruhe (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 14/488,717

(22) Filed: Sep. 17, 2014

(65) Prior Publication Data

US 2015/0083507 A1    Mar. 26, 2015

(30) Foreign Application Priority Data

Sep. 23, 2013  (DE) .......................... 10 2013 110 468

(51) Int. Cl.
| | |
|---|---|
| *B60R 16/04* | (2006.01) |
| *B62D 21/16* | (2006.01) |
| *B60K 1/04* | (2006.01) |
| *B62D 21/15* | (2006.01) |
| *B60R 19/20* | (2006.01) |

(52) U.S. Cl.
CPC . *B62D 21/16* (2013.01); *B60K 1/04* (2013.01); *B60R 19/20* (2013.01); *B62D 21/152* (2013.01); *B60K 2001/0411* (2013.01); *B60Y 2306/01* (2013.01)

(58) Field of Classification Search
CPC ................................ B60R 16/04; Y02E 60/12
USPC ................................................ 180/68.1–68.5
See application file for complete search history.

(56) References Cited

U.S. PATENT DOCUMENTS 7,762,615 B2 *   7/2010   Dayton ...................... 296/180.1

FOREIGN PATENT DOCUMENTS

| DE | 30 32 444 | 4/1982 |
|---|---|---|
| DE | 197 28 288 | 2/1999 |
| DE | 20 2005 042 357 | 3/2007 |
| DE | 10 2011 010 200 | 2/2012 |
| DE | 20 2012 001 596 | 8/2013 |

* cited by examiner

*Primary Examiner* — John Walters
*Assistant Examiner* — James Triggs
(74) *Attorney, Agent, or Firm* — Gerald E. Hespos; Michael J. Porco; Matthew T. Hespos

(57) ABSTRACT

An impact element (10) for a motor vehicle (70) has a flat basic body (12) formed from a rigid material and has connecting sections (16) on one side (50) to fix the basic body (12) to a supporting frame (72) of the motor vehicle (70). The basic body (12) has a gas-tight chamber (24) in which at least one opening (26) is formed to fill the chamber (24) with compressed air.

13 Claims, 5 Drawing Sheets

IMPACT ELEMENT AND SUPPORTING FRAME FOR A MOTOR VEHICLE

CROSS REFERENCE TO RELATED APPLICATION

This application claims priority on German Patent Application No. 10 2013 110 468.1, filed Sep. 23, 2013, the entire disclosure of which is incorporated herein by reference.

BACKGROUND

Description of the Related Art

Impact elements and supporting frames of the type described above function to absorb deformation energy in the event of an impact of a motor vehicle and to increase the passive safety of the motor vehicle.

Electrical energy accumulators of a motor vehicle, such as a traction battery for driving the motor vehicle, customarily have a plurality of battery cells that are accommodated in a rigid, stable housing to protect against damage. High forces and high acceleration peaks may occur in the event of an impact of the motor vehicle. The traction batteries of electrically driven vehicles customarily arranged in a front or rear region near the bumper and may be damaged by such an impact. Damage to the traction battery may put the occupants and other individuals at risk, for example because of voltage surges at exposed electrical components. Thus, the traction batteries of electrically driven vehicles must be protected for an impact situation.

Different possibilities for protecting the traction battery from damage are known. The traction batteries customarily are accommodated for this purpose in a rigid cage or in a part of the supporting frame of the motor vehicle to protect the traction battery in the event of possible deformations of the motor vehicle. A rigid cage disadvantageously increases material and overall weight of the motor vehicle.

DE 10 2005 042 357 A1 discloses a deformation element for a front region of a motor vehicle. This deformation element has a fluid-filled space with openings through which the fluid can escape in the event of an impact on the deformation element. The openings are arranged and dimensioned so that a local, brief action of force allows the fluid easily to escape. However, the fluid cannot escape in the event of an extensive action of force, thereby providing an increased rigidity of the deformation element in the event of an impact of the motor vehicle. A disadvantage of this deformation element is that the fluid increases the overall weight of the motor vehicle and is only conditionally suitable for protecting a traction battery since even brief, local actions of force may damage the traction battery.

It is therefore the object of the invention to provide an impact plate for a motor vehicle and a supporting frame for a motor vehicle to permit increased passive safety with a simultaneously low increase in the weight of the motor vehicle.

SUMMARY OF THE INVENTION

The invention relates to an impact element with a gas-tight chamber in which at least one opening is formed to supply compressed air to the chamber. The impact element may be arranged on an end section of the longitudinal members of the supporting frame of the vehicle.

The gas-tight impact element filled with compressed air increases the stability and rigidity of the impact element without increasing the weight of the impact element. As a result, the passive safety of the motor vehicle can be improved, without increasing the overall weight of the motor vehicle significantly.

The impact element may have an impact plate formed on one side of the basic body and opposite connecting sections. As a result, impact energy can be transmitted uniformly to the connecting sections during an impact.

A joining element may be formed on the at least one opening to connect the opening to a compressor. Thus, compressed air may be supplied to the chamber and stored and kept ready for arbitrary purposes.

The basic body may have plural chambers that are connected to one another by openings. The stability of the impact element can be increased by such a multi-chamber system.

The chambers may be arranged next to one another in a direction of movement of the motor vehicle. As a result, an impact in the direction of travel readily can be absorbed by the intermediate walls, and therefore the stability of the impact element is increased.

The chambers may be arranged one behind another between the impact plate and the connecting sections. As a result, the impact energy can be absorbed in a plurality of stages of the chambers arranged one behind another, thus making it possible to obtain an improved crumple zone.

The basic body may have a second opening to conduct compressed air out of the chamber and to other applications in the motor vehicle.

The chamber may have at least one safety opening that designed to conduct away the compressed air if the chamber has been damaged. Thus, the compressed air stored in the chamber can be conducted away in a controlled manner in the event of an impact to improve protection of the occupants and other individuals.

The safety opening may have a pressure control valve to conduct away the rising positive pressure with little complexity technically in the event of a deformation.

The safety opening may have a predetermined breaking point. Thus, the compressed air can be conducted away in a controlled manner at a predefined section of the basic body with little technical complexity in the event of a deformation.

The flat basic body may have a two-dimensional basic shape. As a result, the impact element can be manufactured with little complexity and requires little construction space in the motor vehicle.

The flat basic body may have a curved basic shape for further increasing the stability of the impact element.

The basic body may be formed from a carbon-fiber-reinforced plastic for further reducing the weight or may be formed from a glass-fiber-reinforced plastic for further increasing the stability or the rigidity of the impact element.

The features mentioned above and those that have yet to be explained below can be used in the respectively stated combination and also in different combinations or on their own without departing from the scope of the invention.

Exemplary embodiments of the invention are illustrated in the drawings and are explained in more detail in the description below.

DETAILED DESCRIPTION

Figure 1:
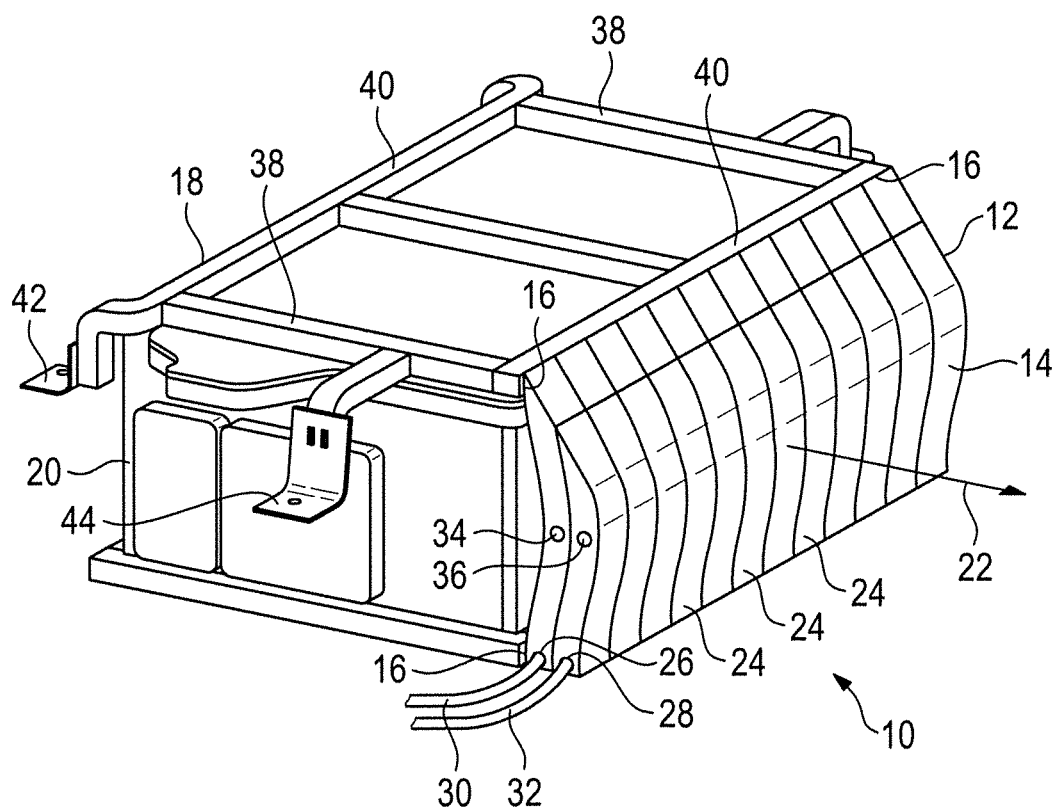
FIG. 1 is a perspective view of a battery frame for a motor vehicle with an impact element.

An impact element for a motor vehicle is illustrated schematically and denoted in general by 10 in FIG. 1. The impact element 10 has a flat basic body 12 that forms an impact plate 14 on one side and is fixed on an opposite side to a battery frame 18 or to a supporting frame of the motor vehicle by fastening sections 16. A traction battery 20 is accommodated in the battery frame 18.

The impact element 10 is arranged in front of the battery frame 18 or the traction battery 20 in a direction of movement, which is indicated by an arrow 22 in FIG. 1. Therefore, in the event of an impact of the motor vehicle, the impact element 10 can absorb deformation energy and can protect the traction battery 20. If the traction battery 20 is arranged in a rear region of the motor vehicle, the impact element 12 can be behind the traction battery in the direction of travel 22 to protect the traction battery 20 in the event of an impact by another vehicle.

The impact element 20 has plural chambers or segments 24 arranged next to one another in the direction of travel 22 and arranged behind one another in the direction of travel 22. Thus, two rows each having twelve chambers 24 one behind another are arranged in the embodiment of FIG. 1. The impact element 10 has an inlet opening 26 and an outlet opening 28 that are connected respectively to a connecting hose 30, 32 for supplying compressed air to the chambers and for conducting compressed air out of the chamber and accordingly to supply said compressed air for use in the motor vehicle. The connecting hose 30 that is connected to the inlet opening 26 is connected for this purpose to a compressor (not illustrated).

The impact element 10 further is provided with safety openings 34, 36 that conduct the compressed air out of the chambers 24 in a controlled manner in the event of an impact of the motor vehicle or in general if the impact element 10 or the chambers 24 are damaged,. The safety openings 34, 36 can be in the form of a membrane, a pressure control valve or a predetermined breaking point in the basic body 12.

The battery frame 18 has longitudinal members 38 and cross members 40 that form a rigid frame and are fixed by fastening elements 42, 44 to a supporting frame (not illustrated) of the motor vehicle to support the traction battery 20 and to protect the traction battery mechanically against deformation.

The basic body 12 can be manufactured from extruded metal profiles, from carbon fiber composite (CFC) glass fiber reinforced plastic (GFRP). To improve energy absorption, the chambers 24 that face the traction battery 20 can be thicker, for example 3.0 mm, to increase the rigidity of the respective chambers 24 in this region, and the chambers 24 that face the impact plate 14 can be thinner, for example 2.0 mm, to ensure easier deformability and a lower weight.

The impact element 10 is reinforced or stiffened by the compressed air. Thus, it possible, with little weight, to provide effective protection of the traction battery 20 and to absorb deformation energy in the event of an impact of the motor vehicle.

Figure 2A:
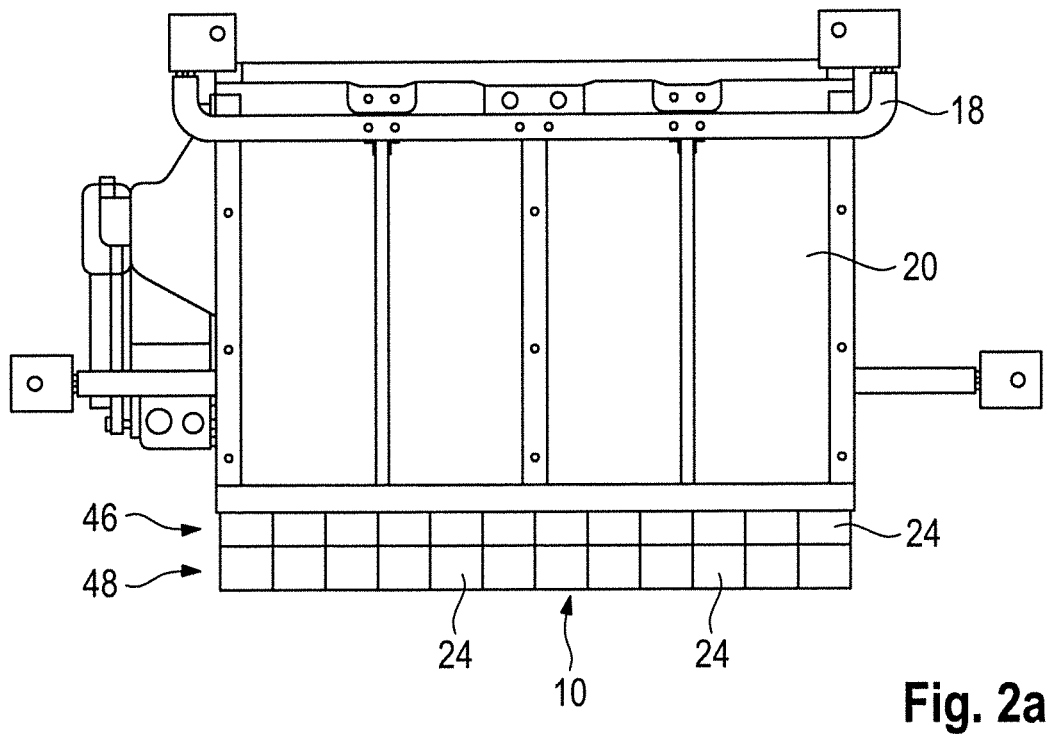
FIGS. 2a-2c show various views of the impact element.
Figure 2B:
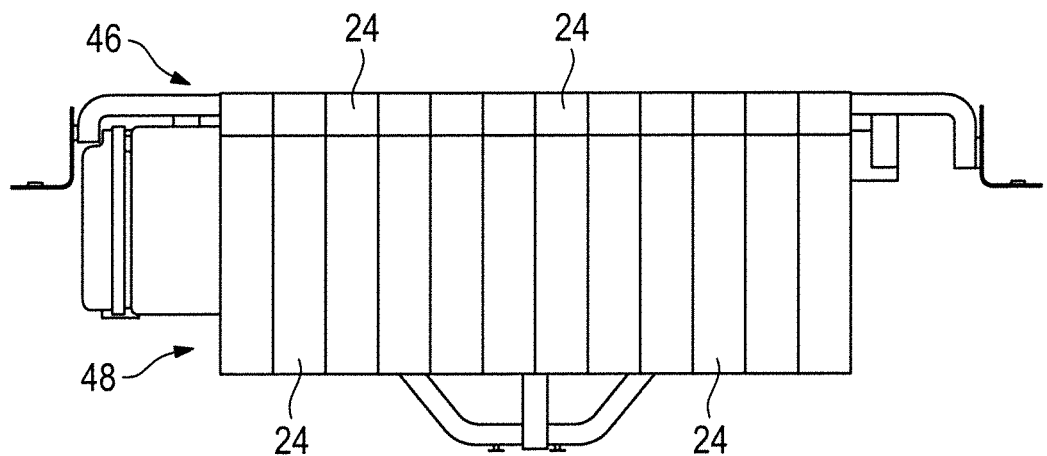
Figure 2C:
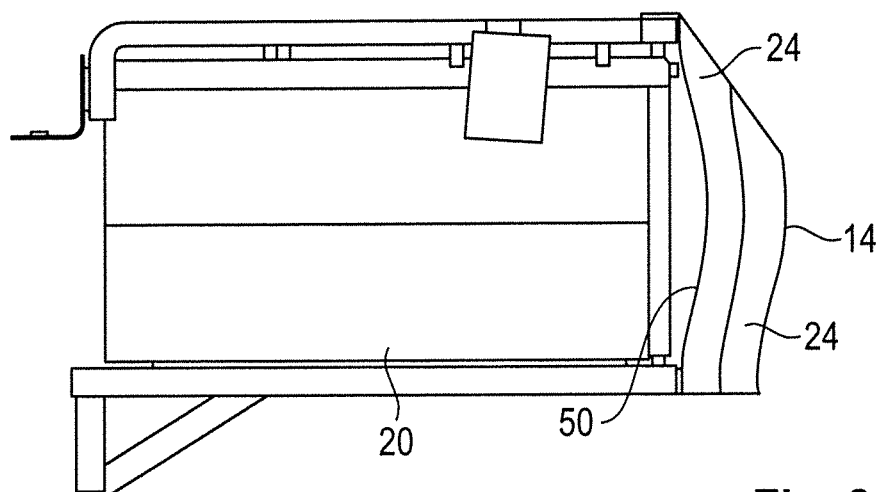

FIGS. 2a-2c schematically illustrate the impact element 10 and the traction battery 20 in different viewing directions. Identical elements are denoted by identical reference numbers, with only special characteristics being explained here.

FIG. 2a illustrates the impact element 10 and the traction battery 20 in a top view. The individual chambers 24 of the impact element are arranged in two rows in front of and behind the traction battery 20, depending on the installation site. The chambers 24 form an inner row 46 and an outer row 48 arranged in front of or behind each other. Furthermore, twelve chambers 24 are arranged next to one another.

FIG. 2b schematically illustrates a front view of the impact plate 14. The chambers 24 of the inner row 46 and the outer row 48 are aligned with one another and are flattened obliquely in an upper region.

FIG. 2c illustrates a side view of the impact element 10 and of the traction battery 20. The basic body 12 has a concave basic shape, with the impact plate 14 being curved convexly in order to be able to better absorb impact energy. The chambers 24 of the two rows 46, 48 are flattened obliquely at an upper end, and an inner surface 50 of the impact element 10 is formed convexly in a manner corresponding to the concave curvature of the impact plate 14. As a result, the deformation energy can be better distributed by the impact element 10 and a generally greater rigidity can be provided.

Figure 3:
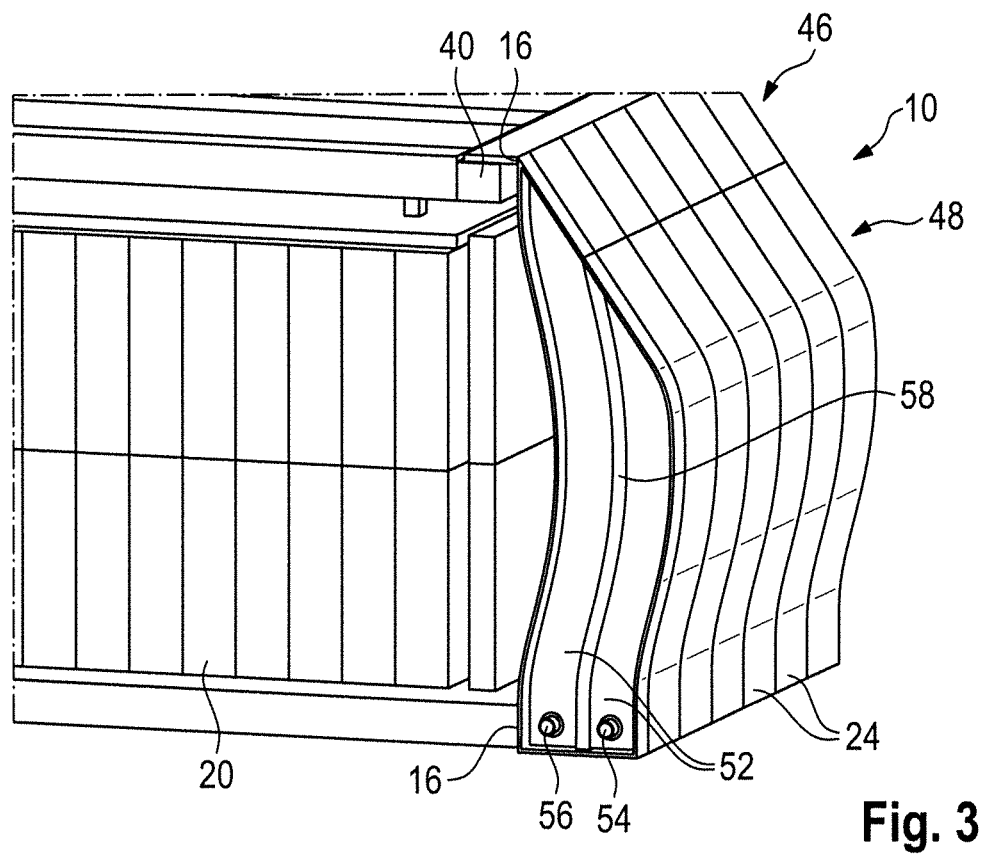
FIG. 3 shows a schematic sectional view of the impact element.

FIG. 3 illustrates a schematic sectional view of the impact element 10 and of the traction battery 20. Identical elements are provided with identical reference numbers, wherein only the special characteristics are explained here.

The chambers 24 are separated from one another by partitions 52 to increase the rigidity of the impact element 10. The partitions 52 extend in the direction of travel 22. The partitions 52 each have an opening 54, 56 to connect the chambers 24 to one another such that the compressed air can be distributed uniformly in the impact element 10. The chambers 24 of the inner row 46 and of the outer row 48 are separated from one another by a transverse partition 58 for further improving the rigidity of the impact element.

Figure 4A:
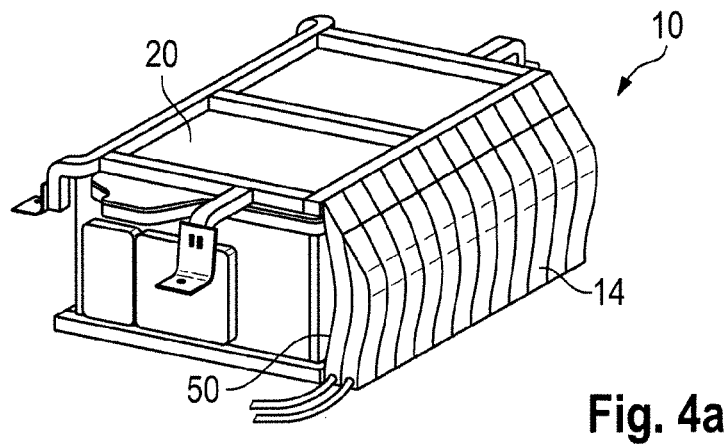
FIGS. 4a-4c show embodiments of the impact element with different basic shapes.
Figure 4B:
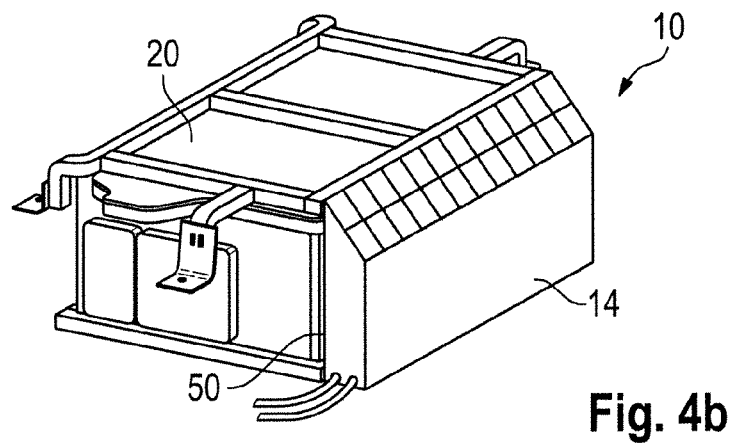
Figure 4C:
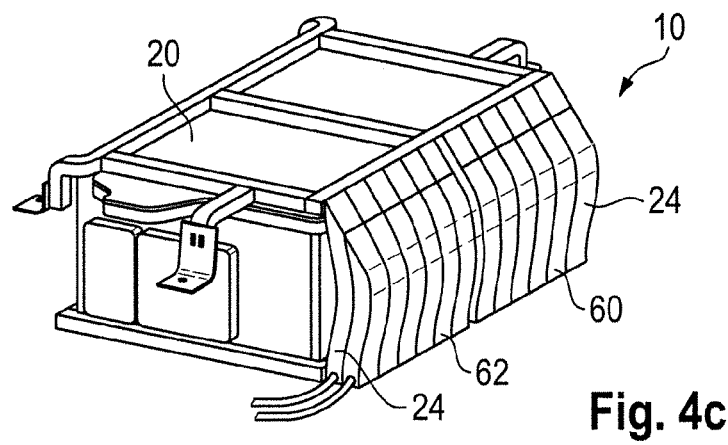

FIGS. 4a-4c show embodiments of the impact element 10 in a perspective illustration. The embodiments from FIGS. 4a-4c have different basic shapes of the basic body 12.

In FIG. 4a, the basic body 12 has a flat and curved basic shape, as already illustrated in FIGS. 1 to 3. The inner surface 50 is curved concavely and the impact plate 14 is curved convexly here.

FIG. 4b schematically illustrates a simplified shape of the basic body 12. The basic body 12 here has a substantially two-dimensional basic shape. The inner surface 50 and the impact plate 14 form parallel planes.

In FIG. 4c, the impact element 10 has two parts 60, 62 arranged next to each other and have chambers 24 arranged next to one another and behind one another. The two parts 60, 62 can be connected to each other to exchange the compressed air with each other, or can form compressed air chambers separately.

Figure 5:
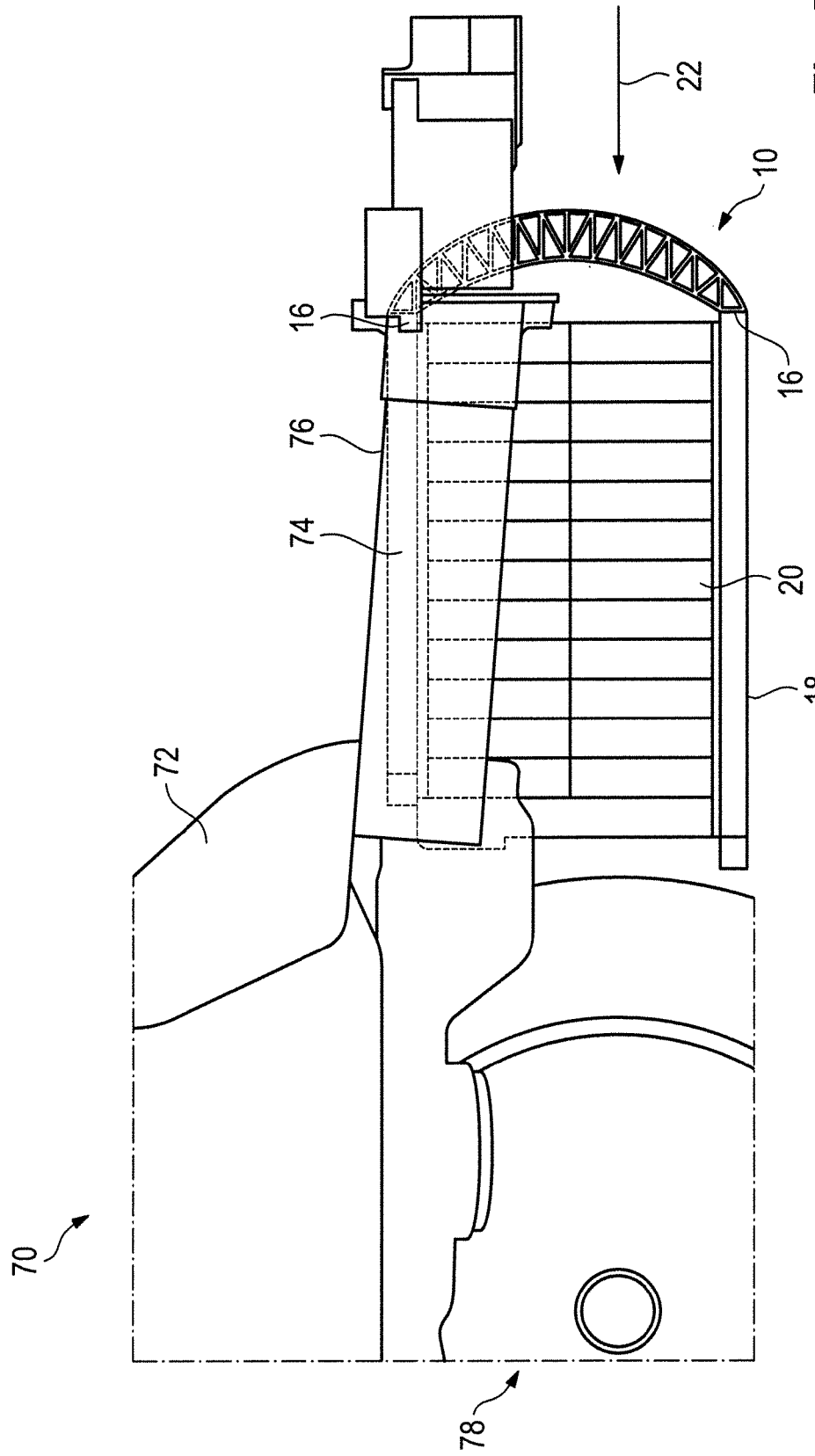
FIG. 5 shows a schematic partial view of a supporting frame of a motor vehicle with an installed traction battery and an impact element.

FIG. 5 schematically illustrates a schematic partial view of a motor vehicle 70. The motor vehicle 70 has a supporting frame 72 with two substantially parallel longitudinal members 74, 76 that extend from a chassis 78 toward an end section of the vehicle 70. In this embodiment, the end section of the motor vehicle 70 is a rear part of the motor vehicle 70, and the battery frame 18 and the traction battery 20 are arranged between the longitudinal members 74, 76. The impact element 10 is arranged behind the battery frame 18 and is fixed to the battery frame 18 by the fastening sections 16. As a result, in the event of an impact of another motor vehicle against the rear section of the motor vehicle 70, the traction battery 20 is protected effectively by the impact element 10. As a result of which the passive safety of the occupant and of other individuals involved against, for example, voltage surges of the traction battery 20 is increased.

What is claimed is:

1. An impact element for a motor vehicle, with a flat body formed from a rigid material and having connecting sections on one side to fix the body to a supporting frame of the motor vehicle, the body having a gas-tight chamber with at least one opening that fills the chamber with compressed air and an impact plate formed on a side of the body opposite the connecting sections.

2. The impact element of claim 1, further comprising a joining element formed on the at least one opening to connect the chamber to a compressor.

3. An impact element for a motor vehicle, with a flat body formed from a rigid material and having connecting sections on one side to fix the body to a supporting frame of the motor vehicle, the body having a plurality of gas tight chambers connected to one another by openings and with at least one inlet opening that fills the chambers with compressed air.

4. The impact element of claim 3, wherein the chambers are arranged next to one another.

5. The impact element of claim 3, wherein the chambers are arranged one behind another between the impact plate and the connecting sections.

6. The impact element of claim 1, wherein the body has a second opening to conduct the compressed air out of the chamber.

7. An impact element for a motor vehicle, with a flat body formed from a rigid material and having connectinq sections on one side to fix the body to a supporting frame of the motor vehicle, the body having a gas-tight chamber with at least one opening that fills the chamber with compressed air, and wherein the chamber has at least one safety opening designed to conduct away the compressed air if the chamber has been damaged.

8. The impact element of claim 7, wherein the safety opening has a pressure control valve.

9. The impact element of claim 7, wherein the safety opening is formed by a predetermined breaking point.

10. The impact element of claim 1, wherein the flat body has a two-dimensional shape.

11. The impact element of claim 1, wherein the flat basic body has a curved shape.

12. A supporting frame for a motor vehicle, with at least two longitudinal members which extend toward one end of the motor vehicle, a receptacle for receiving an electrical energy accumulator, the receptacle being arranged between the longitudinal members, and an impact element arranged on an end section of the longitudinal members, the impact element having a flat body formed from a rigid material and having connecting sections on one side to fix the body to a supporting frame of the motor vehicle, the body having a qas-tiqht chamber with at least one opening that fills the chamber with compressed air.

13. The impact element of claim 3, wherein the basic body has an impact plate formed on one side of the body and opposite the connecting sections.

* * * * *